United States Patent
Falk

(10) Patent No.: US 9,178,878 B2
(45) Date of Patent: Nov. 3, 2015

(54) METHOD FOR DYNAMICALLY AUTHORIZING A MOBILE COMMUNICATIONS DEVICE

(75) Inventor: Rainer Falk, Poing (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/699,066

(22) PCT Filed: Apr. 26, 2011

(86) PCT No.: PCT/EP2011/056561
§ 371 (c)(1),
(2), (4) Date: Nov. 20, 2012

(87) PCT Pub. No.: WO2011/144419
PCT Pub. Date: Nov. 24, 2011

(65) Prior Publication Data
US 2013/0074162 A1  Mar. 21, 2013

(30) Foreign Application Priority Data
May 21, 2010  (DE) .......................... 10 2010 021 256

(51) Int. Cl.
*H04L 29/06*  (2006.01)
(52) U.S. Cl.
CPC ............ *H04L 63/0853* (2013.01); *H04L 63/18* (2013.01)
(58) Field of Classification Search
CPC ....................................................... H04L 63/08
See application file for complete search history.

(56) References Cited

U.S. PATENT DOCUMENTS

| | | | | |
|---|---|---|---|---|
| 6,834,795 B1 * | 12/2004 | Rasmussen et al. | .......... | 235/380 |
| 7,147,494 B2 * | 12/2006 | Lindner | ................... | 439/133 |
| 7,802,091 B2 * | 9/2010 | Halasz et al. | ................. | 713/155 |
| 8,356,171 B2 | 1/2013 | Shatzkamer et al. | | |
| 8,484,708 B2 * | 7/2013 | Chern | ................... | 726/5 |
| 8,555,347 B2 * | 10/2013 | De Graaf et al. | ................. | 726/4 |
| 8,601,266 B2 * | 12/2013 | Aabye et al. | ................. | 713/168 |
| 2001/0045451 A1 * | 11/2001 | Tan et al. | ................... | 235/375 |
| 2004/0172531 A1 | 9/2004 | Little et al. | | |
| 2006/0168647 A1 | 7/2006 | Chiloyan | | |
| 2008/0008125 A1 * | 1/2008 | Pham et al. | .................. | 370/329 |
| 2008/0126258 A1 | 5/2008 | Jacobs et al. | | |

(Continued)

FOREIGN PATENT DOCUMENTS

| | | | | |
|---|---|---|---|---|
| CN | 101432717 A | | 5/2009 | |
| DE | 10 2007 018 363 A1 | | 10/2008 | |
| EP | 1043648 | * | 5/2000 | ............... G06F 1/00 |
| EP | 1574001 | * | 9/2003 | ............... H04L 29/06 |

(Continued)

*Primary Examiner* — Teshome Hailu
*Assistant Examiner* — Thanh Le
(74) *Attorney, Agent, or Firm* — Laurence A. Greenberg; Werner H. Stemer; Ralph E. Locher

(57) ABSTRACT

Physically access-protected service access, such as a service flap having a mechanical lock, for example, are used to ensure the secure establishment of security check information. Logical access security to service functions is produced using the security check information via additional, decentralized service interfaces. For this purpose, it is not the mobile service device that is connected to the physically access-protected communications interface, but rather a second authentication module associated with the mobile service device. Security check information is provided by the authentication module for secure service access to the network via additional, decentralized communications interfaces of the network.

10 Claims, 2 Drawing Sheets

(56) References Cited

U.S. PATENT DOCUMENTS

2008/0301790 A1   12/2008   Halasz et al.
2009/0265776 A1   10/2009   Baentsch et al.

FOREIGN PATENT DOCUMENTS

WO   2008/067332 A2   6/2008
WO   2009/127984 A1   10/2009

* cited by examiner

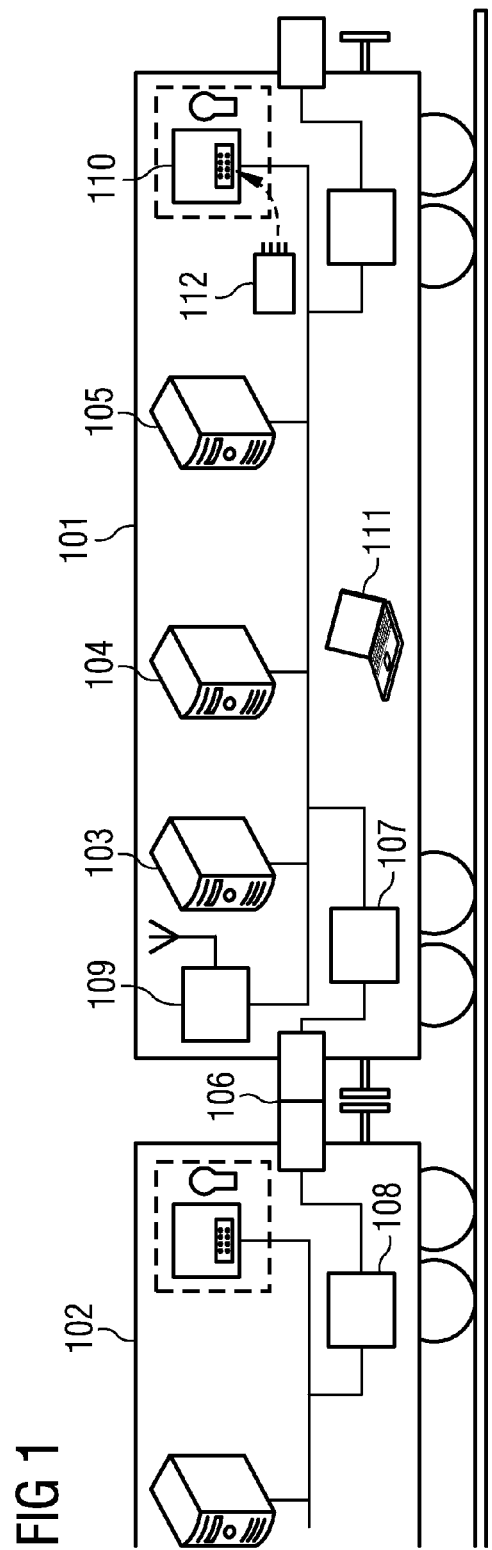

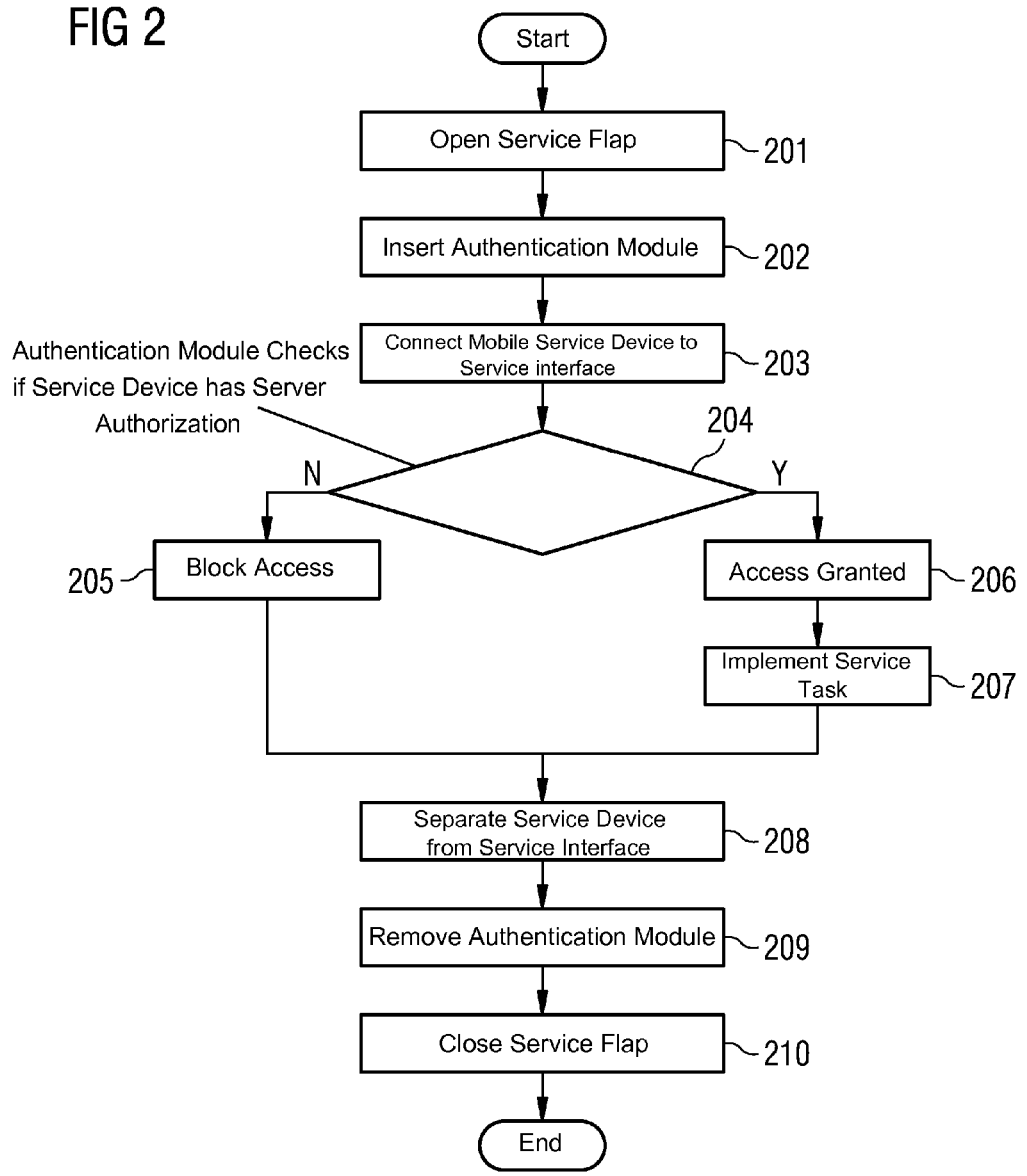

METHOD FOR DYNAMICALLY AUTHORIZING A MOBILE COMMUNICATIONS DEVICE

BACKGROUND OF THE INVENTION

Field of the Invention

The present invention relates to a method, a system and an authentication module for dynamically authorizing a mobile communications device for a network. In particular, these are understood to be mobile service devices, which are permitted access to networks of systems to be serviced.

Technical facilities require servicing work at regular intervals or if they are functioning incorrectly. Mobile service devices, such as Notebooks or PDAs (Personal Digital Assistant) are usually used here, which obtain service access to a specific industrial device, such as for instance a train, a signal box, a production control or a medical device by way of a decentralized accessible interface. The connection to the decentralized accessible interface is established wirelessly or by wire. By way of the service access, diagnostic functions can be called up, fault memories read out, configuration settings of the industrial system modified or software updates imported.

In order to prevent misuse of these sensitive communications interfaces, it must be ensured that service access is only permitted to authorized mobile service devices.

To grant access rights, an authentication check is therefore usually performed, in which the proof of a claimed identity and thus the authorization for access to the respective service interface is checked. If the authentication check is successful, the previously allocated access rights are granted to the respective user.

Most known authentication methods are based on the entity to be authenticated having to prove to a checking entity that it is in possession of a secret and/or an object. The best-known authentication method is the transmission of a password, in which the authenticating entity transmits a secret password directly to a checking entity. The checking entity or the authentication checking unit then checks the accuracy of the transmitted password.

A further known possibility for preventing the misuse of service accesses is to provide the respective network connector for service access in a physically access-protected area. For instance, the network connector can be secured with a closeable service flap or can be located in a closeable room. Such a procedure requires a large number of service interfaces, above all in spatially distributed systems.

When monitoring service accesses in large systems, such methods therefore involve a significant administrative effort, which arises for instance through the issuing of passwords or mechanical keys. The mechanical closure of communications interfaces is also only possible in the case of wired accesses, while with wireless accesses, such a method cannot be used. With wireless service accesses, there is therefore only the option of protecting the respective communications interfaces by specifying service passwords. Particularly with the temporary use of service technicians or freelancers, the respective service passwords should be changed again after terminating the service task on the system to be serviced, which in turn results in an increased configurative outlay in terms of using this method.

BRIEF SUMMARY OF THE INVENTION

The object of the present invention is accordingly to create a method for authorizing network accesses, which reduces the administration and configuration outlay in comparison with previously known methods. This object is achieved by a method, a system and an authentication module having the features of the claims. Advantageous developments of the invention are specified in the dependent claims.

In the inventive method for dynamically authorizing a mobile communications device for a network, an authentication module associated with the mobile communications device is connected to the network by way of a physically access-protected communications interface. The mobile communications device conveys an access request to the network by way of a further wireless or wired communications interface. An item of security check information of the mobile communications device is provided to an authentication checking unit of the network by the authentication module. The authentication checking unit authorizes the mobile communications device for the network with the aid of the access request and the security check information.

An underlying aspect of the present invention is to use a physically access-protected service access, such as for instance an opening for service with a mechanical lock, in order to safeguard the secure facility of the security check information required for the logical access security in terms of at least one service function via at least one further decentralized service interface. For this purpose, it is not the mobile service device that is connected to the physically access-protected communications interface, but rather a second authentication module associated with the mobile service device. Security check information is provided by means of said authentication module for secure service access to the network via additional, decentralized communications interfaces of the network. The access can herewith take place directly with the network and/or with a component of the network, for instance a control computer.

In a further development of the present invention, the security check information is configuration data for setting up a secure network connection of the mobile communications device. This configuration data includes for instance identification information of the mobile communications device, such as for instance a serial number, a network address of the network adapter or a key associated with the mobile communications device. Once the identity of the mobile communications device has been made known to the network in this way by the authentication module, access to the further communications interfaces of the network is hereinafter granted to the mobile communications device following notification of its identity. The mobile communications device therefore uses the security configuration data for authentication with the network, which was already provided to the network by means of the authentication module. The network herewith checks the security configuration data provided by the authentication module and the security configuration data transferred by the mobile communications device.

In a development of the present invention, the security check information is an authentication functionality for setting up a secure network connection of the mobile communications device. A check command is herewith transferred to the authentication module by the authentication check unit. A check response is determined by the authentication module with the aid of the check command and the check response is transferred to the authentication check unit by means of the authentication module. The check response is finally checked by the authentication check unit.

In this development of the present invention, it is not only security configuration data that is provided by the authentication module but instead the authentication module takes over the authentication relative to the network in a challenge-response method for the mobile communications device. From the mobile communications device's point of view, the network in this case operates as an authentication proxy and the authentication module operates as an authentication server. The challenge-response method for the authentication check may be based here on symmetrical or asymmetrical cryptography.

The inventive system for dynamic authorization of a mobile communications device for a network by an authentication check unit of the network comprises an authentication module associated with the mobile communications device, which can be connected to the network via a physically access-protected communications interface. The mobile communications device itself can be connected to the network via further wireless or wired communications interfaces. The authentication module comprises means for providing security check information of the mobile communications device, with the aid of which the mobile communications device is authorized by the authentication check unit of the network. The inventive authentication module is set up to implement the inventive method.

The invention is explained in more detail below with exemplary embodiments with the aid of the appended figures, in which:

BRIEF DESCRIPTION OF THE SEVERAL VIEWS OF THE DRAWING

FIG. 1 shows a schematic representation of an inventive system for dynamic authorization of service accesses in the example of a train carriage, FIG. 2 shows a schematic representation of a flowchart of the inventive method for dynamic authorization of service accesses.

DESCRIPTION OF THE INVENTION

FIG. 1 shows a first and a second train carriage 101, 102, the control devices of which are shown schematically in each instance. A train control system 103, a passenger infotainment system 104 and a train service system 105 are shown, which are connected to one another by way of a network. The network of the individual train carriage 101, 102 is coupled to one another via electro couplings 106. Gateways 107, 108 are also shown, by way of which the network communication is routed between the individual train carriages. There can be wireless of wired external access to the network. The figure shows a wireless access 109 as a wireless LAN Access Point and a wired access 110.

To now enable a mobile service device 111 to access the wireless access point and therefore access the service network of the train, an authentication module 112 associated with the mobile service device is used in a service access 110. The service access 110 is attached behind a closeable service flap so that this is only accessible with the aid of the suitable mechanical key.

A decentralized service access to individual control devices is authorized in this way, with which the mobile service device 111 is connected wirelessly via the access point 109 or with which it is directly connected via a cable link (not shown).

In addition, the mobile service device can obtain access to service functions of a connected train part 102. The authentication module 112 need not be unplugged and plugged into the other train carriages to do this. The method can therefore also be used if the further train carriage does not have its own service access for the authentication module 112. It is sufficient if such a service access is only provided in one train carriage.

Possible technical realizations for dynamic authorization of a mobile communications device with the aid of an authentication module are described below for a network.

Since the authentication module 112 associated with the mobile communications device 111 is connected to the network via a physical access-protected communications interface 110, the mobile communications device 111 conveys an access request to the network via a further wireless communications interface 109. The authentication check unit of the network (not shown) thereupon checks a predeterminable network access (here 110) for the presence of a connected authentication module 112.

In this embodiment of the present invention, the authentication check unit of the network checks, after receiving an access request from a mobile communications device, a predeterminable network access (Port XY) for the presence of a connected authentication module. In an alternative embodiment, the authentication check unit of the network regularly checks for instance a predeterminable network access (Port XY) as to whether an authentication module was connected there. In a further embodiment the authentication check unit of the network checks several predeterminable network accesses for the presence of a connected authentication module.

The claimed authentication module 112 then provides security check information of the mobile communications device to the authentication check unit of the network.

In an embodiment of the present invention, the security check information is configuration data for setting up a secure network connection of the mobile communications device. This configuration data includes for instance identification information of the mobile communications device, such as a serial number, a network address of the network adapter or a key associated with the mobile communications device.

In an alternative embodiment of the present invention, the security check information is an authentication functionality for setting up a secure network connection of the mobile communications device. In this embodiment a check command is conveyed to the authentication module 112 by the authentication check unit. A check response is determined by the authentication module 112 with the aid of the check command and the check response is conveyed to the authentication check unit by the authentication module 112. The check response is finally checked by the authentication check unit.

In this embodiment of the present invention, it is not only security configuration data which is provided by the authentication module 112 but instead the authentication module takes over the authentication relative to the network in a challenge-response method for the mobile communications device 111. From the mobile communications device's point of view, the network operates in this case as an authentication proxy and the authentication module 112 as an authentication server. The challenge-response method for authenticity checking can be based here on symmetrical or asymmetrical cryptography. It can be realized for instance by means of an EAP protocol (Extensible Authentication Protocol) or according to a 4-way handshake in accordance with IEEE 802.11.

The authentication check unit finally authorizes the mobile communications device 111 for the network with the aid of the access request and the security check information.

Since the identity of the mobile communications device was made known to the network by the authentication module, access to the further communications interfaces of the network is hereinafter granted to the mobile communications device after communicating its identity.

In an embodiment of the present invention, a granted service access remains valid provided the authentication module is inserted. In a further embodiment of the present invention, a granted service access remains valid for a predeterminable period of time, irrespective of whether or not the authentication module is inserted.

Provided service access is granted to a mobile communications device, it can repeatedly be given service access. Therefore after interrupting a connection or in the event of a change to another communications interface in the network, access can be granted to the network.

An already existing service access of a mobile communications device can be terminated if the service access granted to the mobile communications device is no longer valid, e.g. if the authorization module associated with the mobile communications device is separated from the network. In a variant, an already existing service access also remains, even if the service access granted to the mobile communications device is no longer valid. It can then however not obtain service access again, e.g. at another communications interface of the network.

In an embodiment of the present invention, a warning message is generated if a connection between the mobile service device and the authentication module had not existed for a certain period of time or the authorization was not deactivated again.

In a further variant, deactivation of the access authorization takes place if the access was not used during a predeterminable period of time.

In an embodiment of the present invention, a mobile service device is associated with a specific authentication module. In a variant, the changeable bond of the authentication module to a specific mobile service device takes place by it being connected to the mobile service device.

The described method temporarily authorizes a mobile service device which can be associated with the authentication module for service access to a specific industrial system. The thus authorized mobile service device may access further, in particular wireless service interfaces of the industrial system. Here it uses for instance security configuration data for authentication relative to the industrial system, which is checked by the industrial system using the security configuration data set up by means of the authentication module.

A temporary bond is set up, wherein a physical access protection is used as a security feature. This temporary bond enables the protected service access to this industrial system by means of this bound mobile service device, wherein further interfaces can be used herefor, which were not used by the access protection used to set up the bond. The physical access protection is therefore used to set up a logical access protection which is independent thereof.

FIG. 2 shows in a schematic representation a flowchart of the inventive method for dynamic authorization of a network access. The service flap of an industrial system is first opened 201. The authentication module is then inserted. The mobile service device is then connected to a service interface wirelessly or by wire. A check is hereinafter carried out to determine whether the inserted authentication module is associated with the mobile service device and has a service authorization 204. If this is not the case, the service access is blocked 205. If the inserted authentication module can be associated with the mobile service device and the mobile service device has a service authorization, the service access is granted 206 and the service task can be implemented 207.

Finally, the service device is separated from the service interface 208. The authentication module can hereinafter likewise be removed 209. Finally the service flap is closed again mechanically 210.

The basic idea behind the invention can also be transferred to other mobile communications devices, such as for instance the telephone of a train conductor or the device for checking tickets, which are dynamically linked to the respective network.

An existing physical access security is used in order to set up a logical access security to service functions, which are not covered by the physical access security. The administrative outlay for managing logical security information is therefore reduced or avoided.

Service access is not, as currently usual, only possible by way of the physically protected service access, but the service device can be carried along decentrally, in order also to be able to access the industrial system spatially more independently, for instance by way of WLAN. Particularly with a train equipped with WLAN, the authentication module must only be inserted behind the service flap in order thereupon to be able to access train service functions in the entire train via WLAN. An option which is extremely simple to use is thus created, in order to permit a specific mobile service device access to service functions.

The invention claimed is:

1. A method for dynamic authorization of a mobile communications device for a network, which comprises the steps of:
   connecting an authentication module associated with the mobile communications device to the network via a physically access-protected communications interface, the authentication module being physically separate from the mobile communications device and being physically separate from the network, the authentication module being connected to the network when the mobile communications device needs access to the network;
   transferring, via the mobile communications device, an access request to the network via a further wireless or wired communications interface;
   providing an authentication check unit of the network with security check information of the mobile communications device directly from the authentication module, the authentication check unit authorizing the mobile communications device for the network with an aid of the access request and the security check information; and
   physically disconnecting the authentication module from the network after access is granted to the mobile communication device.

2. The method according to claim 1, wherein the security check information is configuration data for setting up a secure network connection of the mobile communications device.

3. The method according to claim 2, wherein the configuration data includes at least one of identification information of the mobile communications device, symmetrical key information or asymmetrical key information for setting up the secure network connection.

4. The method according to claim 1, wherein the security check information is an authentication functionality for setting up a secure network connection of the mobile communications device, the method further comprises:
   transferring a check command by the authentication check unit to the authentication module;
   determining a check response by the authentication module with an aid of the check command;
   transferring the check response to the authentication check unit by the authentication module; and analyzing the check response via the authentication check unit.

5. A system for dynamic authorization of a mobile communications device for a network by an authentication check unit of the network, the system comprising:
   an authentication module associated with the mobile communications device, said authentication module having a processor and a memory electrically connected to said memory;
   a physically access-protected communications interface for connecting said authentication module to the network, said physically access-protected communications interface enclosed in said lockable mechanical closure apparatus thus providing restricted public access;
   further wireless or wired communications interfaces for connecting the mobile communications device to the network; and
   said authentication module having means, which includes said processor and said memory, for providing security check information of the mobile communications device, with an aid of which the mobile communications device is authorized by the authentication check unit of the network, the authentication check unit of the network receiving the security check information directly from the authentication module, said authentication module being physically separate from the mobile communications device and being physically separate from the network, said authentication module being connected to the network when said mobile communications device needs access to the network and being physically disconnectable from the network after access is granted.

6. The system according to claim 5, wherein the security check information is configuration data for setting up a secure network connection of the mobile communications device.

7. The system according to claim 6, wherein the configuration data includes at least one of identification information of the mobile communications device, symmetrical key information or asymmetrical key information for setting up a secure network connection.

8. The system according to claim 5, wherein the security check information is an authentication functionality for setting up a secure network connection of the mobile communications device, and said authentication module and the authentication check unit are embodied such that:
   a check command can be transferred to said authentication module by the authentication check unit;
   a check response can be determined by said authentication module with an aid of the check command and the check response can be transferred to the authentication check unit by said authentication module; and
   the check response can be checked by the authentication check unit.

9. An authentication module providing a dynamic authorization of a mobile communications device for a network, the authentication module stored in non-transitory formed and being programmed to, when loaded into a memory of a non-transitory computer to:
   connect the authentication module associated with the mobile communications device to the network via a physically access-protected communications interface, the authentication module being physically separate from the mobile communications device and being physically separate from the network, the authentication module being connected to the network when the mobile communications device needs access to the network;
   transfer, via the mobile communications device, an access request to the network via a further wireless or wired communications interface;
   provide an authentication check unit of the network with security check information of the mobile communications device directly from the authentication module, the authentication check unit authorizing the mobile communications device for the network with an aid of the access request and the security check information; and
   physically disconnect the authentication module from the network after the mobile communication device is authorized to access the network.

10. A method for dynamic authorization of a mobile communications device for a network, which comprises the steps of:
   connecting an authentication module associated with the mobile communications device to the network via a physically access-protected communications interface protected and enclosed in a lockable mechanical closure apparatus thus providing restricted public access, the authentication module being physically separate from the mobile communications device and being physically separate from the network, the authentication module being connected to the network when the mobile communications device needs access to the network;
   transferring, via the mobile communications device, an access request to the network via a further wireless or wired communications interface;
   providing an authentication check unit of the network with security check information of the mobile communications device directly from the authentication module, the authentication check unit authorizing the mobile communications device for the network with an aid of the access request and the security check information; and
   physically disconnecting the authentication module from the network after the mobile communication device is authorized to access the network.

* * * * *